US 6,695,021 B2

(12) United States Patent
Englert

(10) Patent No.: US 6,695,021 B2
(45) Date of Patent: Feb. 24, 2004

(54) MOLDING MACHINE AND METHOD FOR ADJUSTING AT LEAST ONE SPINDLE OF THE MOLDING MACHINE

(75) Inventor: Heinrich Englert, Lauda-Königshofen (DE)

(73) Assignee: Michael Weinig Aktiegesellschaft, Tauberbischofsheim (DE)

( * ) Notice: Subject to any disclaimer, the term of this patent is extended or adjusted under 35 U.S.C. 154(b) by 0 days.

(21) Appl. No.: 10/064,513

(22) Filed: Jul. 23, 2002

(65) Prior Publication Data
US 2003/0019094 A1 Jan. 30, 2003

(30) Foreign Application Priority Data
Jul. 27, 2001 (DE) .......................... 101 36 767

(51) Int. Cl.⁷ .......................... B23Q 15/00; B27B 31/00; B27C 1/12

(52) U.S. Cl. ................ 144/404; 144/114.1; 144/117.1; 144/246.1; 144/248.4; 144/250.18; 144/250.26; 144/357; 198/782; 409/194; 700/167

(58) Field of Search ................................. 700/132, 174, 700/175, 193, 159, 160; 198/780, 782; 409/194, 218; 144/114.1, 116, 117.1, 242.1, 246.1, 248.4, 250.12, 250.26, 356, 357, 382, 402, 404, 394

(56) References Cited
FOREIGN PATENT DOCUMENTS
DE          197 56503    *  6/1999

* cited by examiner

Primary Examiner—W. Donald Bray
(74) Attorney, Agent, or Firm—Gudrun E. Huckett

(57) ABSTRACT

A molding machine for machining workpieces of wood or plastic material has a transport path for transporting workpieces in a transport direction and adjustable spindles arranged sequentially in the transport direction on the transport path. Tools are fixedly connected on the spindles. Adjusting elements are drivingly connected to the spindles. First indicator devices are coupled to the adjusting elements and indicate a position of the spindles relative to a reference point of the machine, respectively. At least one data storage device is connected to the indicator devices and configured to save position data of the spindles and to allow retrieval of the position data of the spindles.

18 Claims, 4 Drawing Sheets

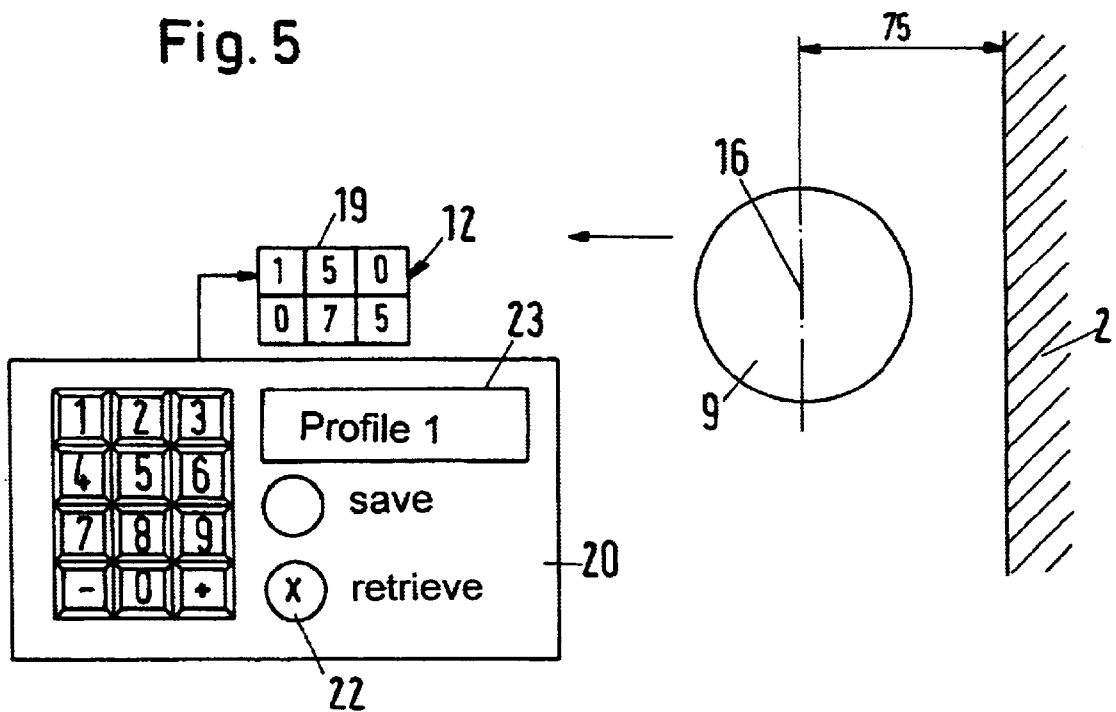
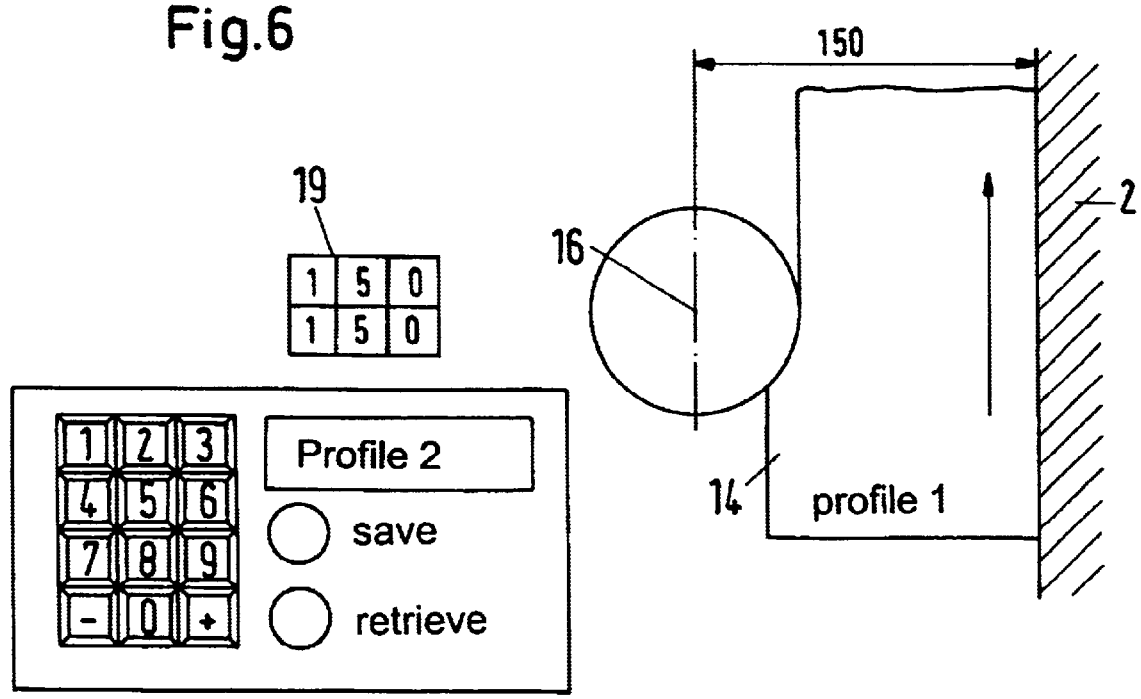

MOLDING MACHINE AND METHOD FOR ADJUSTING AT LEAST ONE SPINDLE OF THE MOLDING MACHINE

BACKGROUND OF INVENTION

1. Field of the Invention

The invention relates to a molding machine for machining workpieces of wood, plastic material, and the like, comprising at least one transport path for the workpieces and comprising tools which are fixedly connected to spindles that are adjustable and drivingly connected to adjusting elements, preferably, adjusting spindles. The invention also relates to a method for adjusting at least one spindle of the molding machine relative to a reference point of the machine.

2. Description of the Related Art

By means of molding machines workpieces passing through the machine are machined on several sides by tools seated on the spindles. The spindles must be adjusted to the dimensions of the workpiece as well as to the profile to be produced on this workpiece. It is known to store or save the data in regard to the profile as well as the measured tool data in a computer memory. Based on these stored profile data and tool data, the adjusting values for the spindles required for producing the desired profile are computed by means of a computer program.

SUMMARY OF INVENTION

It is an object of the present invention to configure a molding machine of the aforementioned kind and a method of the aforementioned kind such that the adjusting device for adjusting the spindle is simple and inexpensive.

In accordance with the present invention, this is achieved in regard to the molding machine in that the adjusting elements are coupled with indicating devices which indicate the position of the spindles relative to a reference point of the machine, wherein the indicating devices are connected to at least one data storage device (e.g., computer memory) in which the position data of the spindles can be saved and from which they can be retrieved.

In accordance with the present invention the object is solved in regard to the method in that the spindles are adjusted in a desired position relative to a reference point of the machine and in that the actual value corresponding to this position is saved in the data storage device (e.g., computer memory) from which the saved actual value can be retrieved as a nominal value for a new adjustment of the spindle into the same position.

In the molding machine according to the invention, the spindle is adjusted relative to the reference point of the machine into a predetermined position. The corresponding position value is indicated by the indicator device. The position value of the spindle is saved as an actual value in the computer memory. If it is desired to position the spindle again in this position, the saved actual value is retrieved from the data storage device and then again indicated on the indicator device. The operator of the molding machine according to the invention must then only adjust the spindle according to the method of the present invention such that the actual value displayed on the indicator device coincides with the retrieved nominal value which is also displayed on the indicator device. In this connection, a computer program for determining the adjusting data is not required. Accordingly, the molding machine according to the invention can be manufactured cost-efficiently. The indicator device can also be configured such that, when retrieving the nominal value from the data storage device, the differential value to the current actual position of the spindle is indicated. In this case, the operator of the molding machine according to the invention must adjust the spindle such that the indicated differential value becomes zero.

BRIEF DESCRIPTION OF DRAWINGS

In the drawing:

FIG. 5 shows a first step of the adjusting process of the spindle of the molding machine according to the invention based on a retrieved nominal value;

FIG. 6 illustrates completion of the adjustment of the spindle of the molding machine based on the retrieved nominal value, showing identical actual and nominal values.

DETAILED DESCRIPTION

Figure 1:
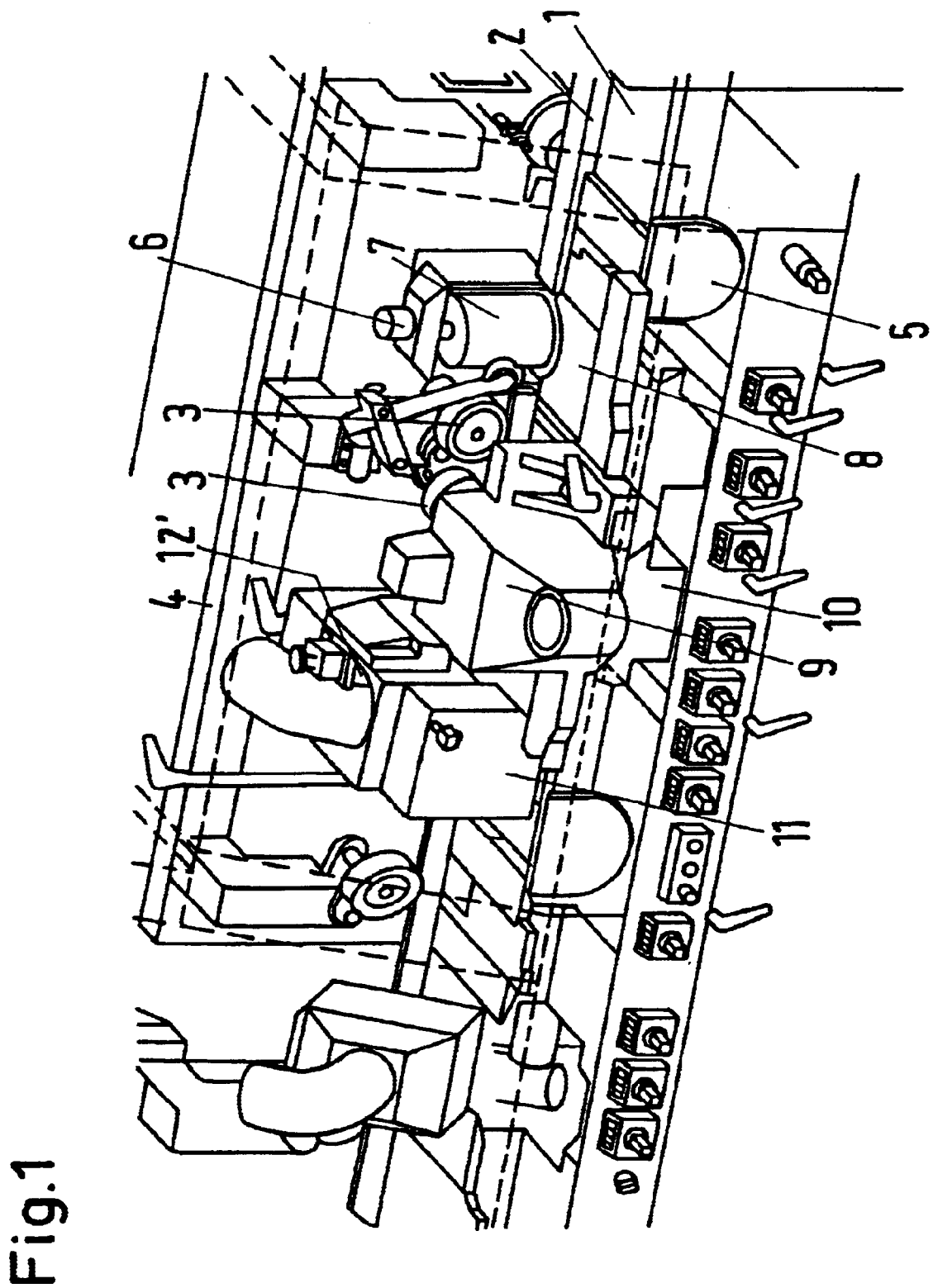
FIG. 1 is a perspective view of a molding machine according to the invention.

The molding machine serves for machining workpieces of wood, plastic material, and the like which are transported through the molding machine in order to be machined on their sides, as is known in the art. The molding machine has a transport path 1 on which the workpieces (not illustrated) are transported. During their transport through the molding machine, these workpieces rests against the ledge 2 which extends across the length of the molding machine and is interrupted in the area of lateral spindles. In FIG. 1, the workpieces are transported from the right to the left on the transport path 1. Transport rollers 3 are provided for transporting the workpieces: they rest against the workpieces and are driven in rotation. The transport rollers 3 are suspended from a transport beam 4 which is positioned at a spacing above the transport path 1.

Upon passing through the molding machine, the workpieces are machined first by a tool 5 which is seated on a horizontal trim spindle positioned underneath the transport path 1. By means of this tool 5 the bottom side of the workpiece is machined, in particular, planed. The transport path 1 has an opening for allowing the tool 5 to penetrate.

In the transport direction at a spacing behind the lower trim spindle, the molding machine is provided with a vertical spindle 6 on which a tool 7 is positioned with which the right side of the workpiece, viewed in the transport direction, is machined. The spindle 6 is positioned on a transverse slide 8 which extends preferably perpendicularly to the transport direction of the workpieces through the molding machine. By means of the transverse slide 8, the tool 7 can be moved transversely, preferably perpendicularly, to the transport direction.

In the transport direction behind the tool 7, a tool 9 is positioned which is arranged on the left side, viewed in the transport direction, of the workpieces. This tool 9 is fixedly connected to a vertical spindle. The tool 9, together with its spindle, is supported on a transverse slide 10 which can be moved transversely, preferably perpendicularly, to the transport direction of the workpieces. The two transverse slides 8, 10 are positioned at a spacing from one another. The top sides of the transverse slides 8, 10 are positioned advantageously in a common plane with the top side of the transport path 1 so that the transport of the workpieces at the transition between the transport path 1 and the transverse slides 8, 10 is trouble-free. However, the top sides of the transverse slides 8, 10 can also be positioned lower than the transport path 1. In this case, separate table tops are positioned in this area and form part of the transport path 1.

At a spacing behind the tool 9, a tool 11 is positioned which is connected fixedly on a horizontal spindle arranged in the area above the transport path 1 and the workpieces. By means of the tool 11 the top side of the workpiece is machined, for example, by planing. The molding machine can have additional tools, for example, additional lower spindles.

By means of the molding machine, very different machining operations can be carried out on the workpieces in a simple way. When the tools 5, 7, 9, 11 are arranged as shown in FIG. 1, the workpieces, which are transported along the ledge 2 extending in the transport direction, are first planed on the bottom side by the tool 5. Subsequently, by means of the tool 7 the longitudinal side of the workpiece positioned to the right in the transport direction is planed. Subsequently, the tool 9 planes the longitudinal side of the workpiece positioned to the left in the transport direction, thereby determining the finished workpiece width. Finally, the top side of the workpiece is planed with the tool 11 downstream of tool 9, and this determines the thickness of the finished workpiece.

The tools 5, 7, 9, 11 can also be molding tools, i.e., they support molding cutters which have the desired mold profile. By means of the molding cutters, the corresponding sides of the workpiece are profiled. It is also possible, depending on the application, to position on some spindles planing tools and on other spindles molding tools so that the corresponding sides of the workpiece are planed or molded.

After having passed through the molding machine, the workpieces have been machined on their sides. The workpieces are guided at a minimal spacing to one another sequentially along the different tools 5, 7, 9, 11 which perform the corresponding machining action on the workpieces.

Figure 2:
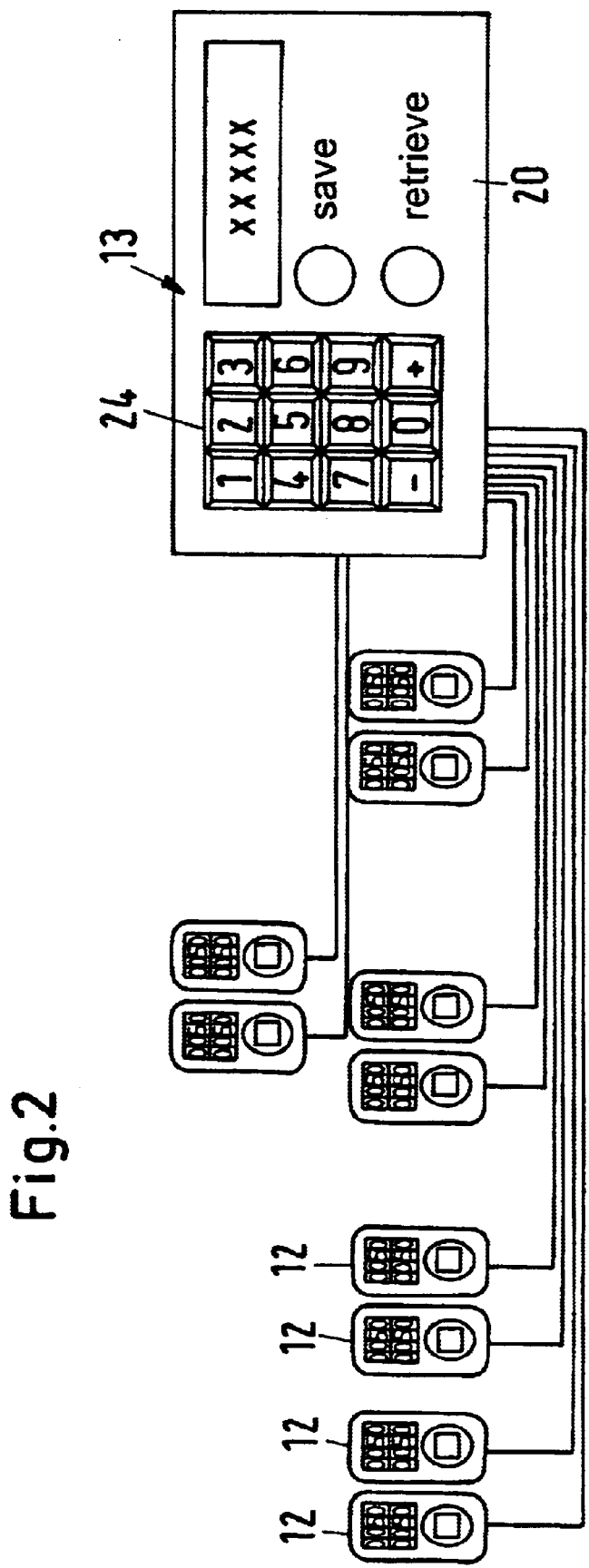
FIG. 2 shows in a schematic illustration an adjusting device of the molding machine according to FIG. 1.

As is known in the art, the spindles supporting the tools 5, 7, 9, 11 must be adjusted depending on the workpiece and the mold profile to be produced. For this purpose, the molding machine is provided with an adjusting device which comprises indicator devices 12 (FIG. 2) for the different axis adjustments of the spindles. All of the indicator devices 12 are connected to a data storage device (e.g., computer memory) 13 in which, in a way to be described in the following, the actual data of all spindles 12 are saved under assigned program numbers or assigned program names or profile names. When the molding machine is to be adjusted again for producing a corresponding workpiece profile, the adjusting data, which have been saved with the corresponding program number or the corresponding program name or profile name in the memory 13, can be retrieved and transmitted to the individual indicator devices 12.

With the aid of FIGS. 3 through 6 the adjusting method by means of the adjusting device will be explained in an exemplary fashion in connection with the adjustment of one spindle.

Figure 3:
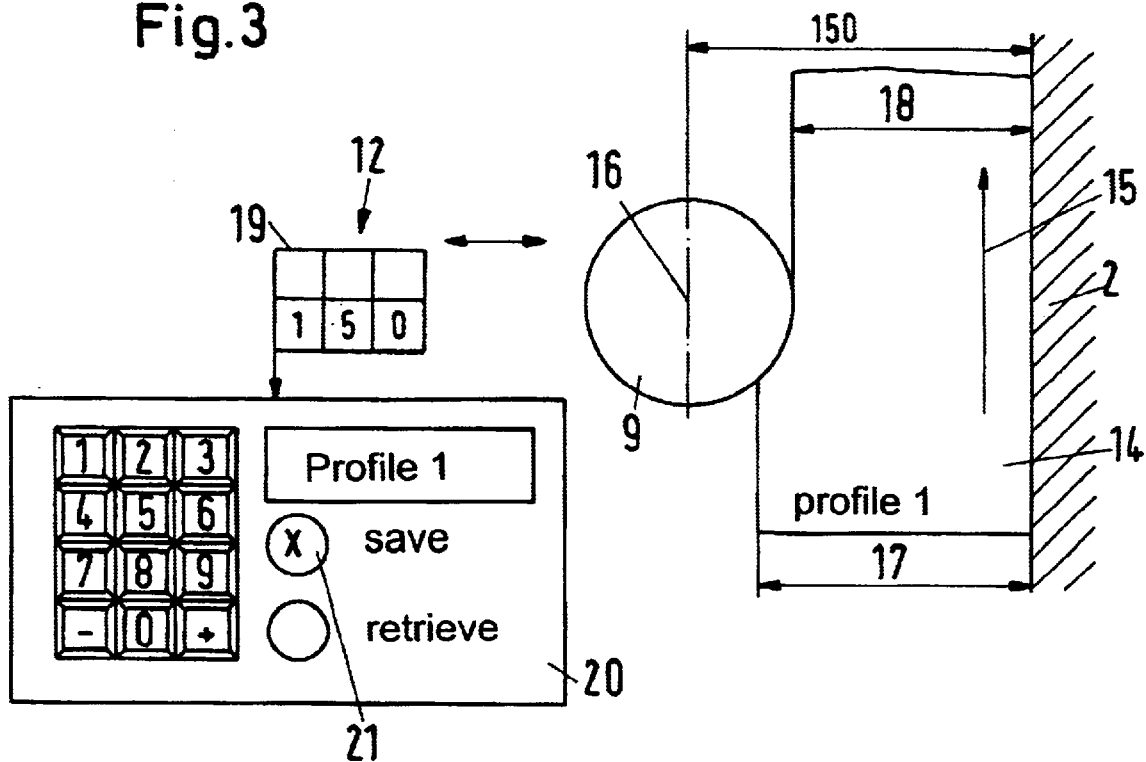
FIG. 3 shows an adjusting process for a spindle of the molding machine according to the invention for a first workpiece.

FIG. 3 shows the workpiece 14 to be machined which is transported along the ledge 2 in the transport direction 15 through the molding machine. The workpiece 14 is to be machined on its left side in the transport direction 15 by the tool 9 which is fixedly connected to the spindle 16. The spindle 16 is adjusted relative to the ledge 2 such that it has a spacing of 150 mm from the ledge 2; the ledge 2 serves as the reference point of the machine. The workpiece 14 has the width 17 before the step of machining by the tool 9. After machining by the tool 9, the workpiece 14 has a reduced width 18. The indicator device 12 correlated with the spindle 16 is seated on the corresponding adjusting spindle of the tool spindle 16 and has a display 19 on which the spacing of the spindle 16 from the ledge 2 is displayed, preferably electronically. In the described embodiment, the display 19 shows the value 150. The indicator device 12 is drivingly connected, as is known in the art, by a sleeve (not illustrated) with the adjusting spindle and determines, for example, in accordance with the principle of a rotary transducer, the spacing of the machine spindle 16 from the ledge 2 by means of the rotary movement of the adjusting spindle, taking into account the pitch of the spindle; the measured spacing is indicated on the display 19.

In this way, all spindles of the molding machine are moved into the position required for manufacturing the profile on the workpiece 14. The adjustments are saved with a program number, a program name or profile name in a defined sequence within the data storage device 13. In the described embodiment, the data are saved under the name "profile 1". For this purpose, the "save" key 21 of an input device 20 provided with an alpha-numeric keypad 24 is pushed to activate the saving function.

Figure 4:
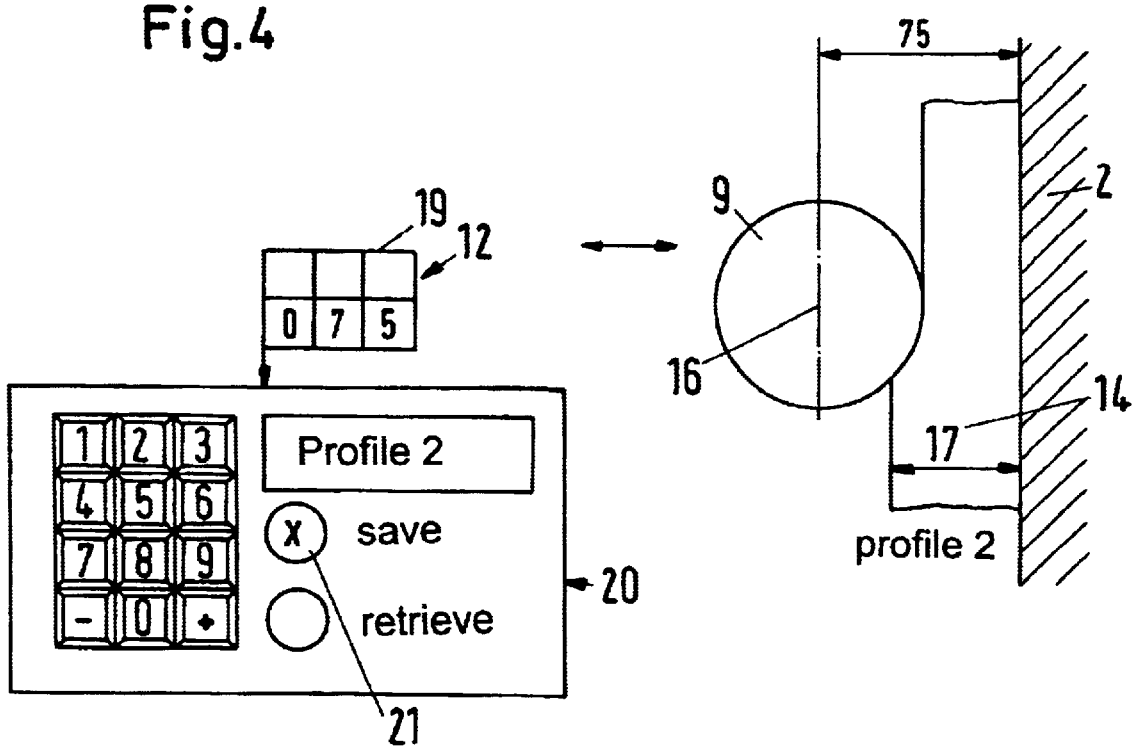
FIG. 4 shows the adjusting process for a spindle of the molding machine according to the invention for a second workpiece.

FIG. 4 shows a situation according to which a new workpiece 14 is to be machined by means of the tool 9 on the spindle 16 to have a profile 2 having a width 17 that is smaller in comparison to that of the example of FIG. 3. In this case, the spindle 16 is adjusted such that it has a spacing of 75 mm from the ledge 2 of the molding machine. This adjusted dimension is shown on the display 19 of the indicator device 12. All spindles of the molding machine are adjusted to the new workpiece 14 with the profile 2 having the width 17, and the corresponding positions of the respective spindles of the molding machine are displayed on the display 19 of the corresponding indicator device 12, respectively. As soon as all spindles of the molding machine have been adjusted to this new workpiece, the adjustment values of the various spindles are transmitted in the defined sequence to the data storage device 13 by pushing the "save" key 21 of the input device 20 and are stored under the name "profile 2" in the illustrated embodiment.

All positions of the spindles of the molding machine are stored in this way as actual values, relative to a certain profile of the workpiece 14, in the data storage device 13.

In the same way, the position data of the pressing elements are also advantageously determined and stored in the data storage device 13. The pressing elements are arranged, as is known in the art, in front of and behind the tool seated on the corresponding spindle and rest on the workpieces 14. The pressing elements are adjusted relative to the tool in order to exert an optimal pressing action onto the workpiece 14. The pressing elements advantageously also have correlated indicator devices 12' with which, in the same way as in the case of the spindles, the position of the pressing elements are determined. One of these indicator devices 12' is illustrated in FIG. 1; it is used to determine the position of one of the pressing elements (not illustrated) correlated with the upper horizontal spindle. This indicator device 12' is connected also to the data storage device 13.

FIGS. 5 and 6 show the situation that the adjusting data for the spindles of the molding machine are retrieved from the data storage device 13 in order to manufacture the profile 1 on the workpiece 14. In an exemplary fashion the lower field or window of the display 19 of the corresponding indicator device indicates the value 75 from which it can be taken that the spindle 16 for the tool 9 has a spacing of 75 mm from the ledge 2 of the molding machine. In order to transmit the data for the profile 1 from the data storage device 13 to the respective indicator devices 12, first the name "profile 1" is selected on the input device 20 on an input display 23 of the input device 20 and, subsequently, the "retrieve" key 22 is pushed. By doing so, the adjusting data which have been stored under the name "profile 1" in the data storage device 13 are transmitted in the defined sequence to the respective indicator devices 12 and displayed in the upper field or window of the display 19, respectively. As described in connection with FIG. 3, the spindle 16 is arranged at a spacing of 150 mm relative to the ledge 2 for manufacturing the profile 1. Accordingly, this value is shown in the upper display window of the display 19 of the corresponding indicator device 12. In the lower display window of the display 19, the current value for the spacing of the spindle 16 from the ledge 2 is displayed which in the present example is 75 mm. The operator of the molding machine must now move the spindle 16 to such an extent until in the lower display field of the display 19 the value 150 is shown (FIG. 6). Now the spindle 16 has a spacing of 150 mm from the ledge 2.

Simultaneously, the adjusting data with the name "profile 1" are also transmitted to the respective spindles and their indicator devices 12 in this way. The operator of the molding machine must then only take care that the same value is displayed in the two display fields of the respective displays when moving the spindles for adjustment.

In the same way, the corresponding data from the data storage device 13 are transmitted also to the indicator devices 12' correlated with the pressing elements. When the actual value deviates from the nominal value, the corresponding pressing element is adjusted such that the indicated actual value coincides with the nominal value.

In order to check whether the adjustments of the molding machine are correct, a test run is carried out on a workpiece. For example, should the described circle of the tool 9 have changed in the-time between saving of the adjusting data and the time of retrieval, for example, by regrinding the cutting blades, the required readjustment of the respective spindle can be determined after the test run and a corrective adjustment can carried out. The new actual data are then transmitted into the storage device 13, as illustrated in connection with FIGS. 3 and 4, by pushing the "save" button or key 21 of the input device 20 and selecting the corresponding name.

With the described procedure, by means of the adjusting device the molding machine can be adjusted with very minimal expenditure and in a simple way to the workpiece profile to be manufactured. The adjusting data which are saved in the data storage device 13 are actual data when being measured; when retrieved from the data storage device they become nominal data in the display 19 of the respective indicator device 12. The operator of the molding machine must only adjust the respective spindle such that the actual position of the spindle coincides with the nominal position which is retrieved from the data storage device 13. This can be easily monitored on the display 19 with the two display fields. When after the test run through the molding machine the workpiece 14 does not coincide with the nominal profile because, for example, the tools have been reground, the adjustment of the spindles is accordingly corrected. The new adjusting data are then again transmitted in the described way to the data storage device as actual values.

When the data storage is not used, the molding machine can also be adjusted by means of the mechanical indicator devices in a conventional way according to determined adjusting and tool data or according to a wood sample pattern.

Since the respective spindle can be adjusted in its longitudinal direction as well as transverse to its longitudinal direction in the molding machine, in the illustrated embodiment two indicator devices 12 are provided for each spindle.

In the illustrated and described embodiment, the indicator device 12, 12' has a display 19 with two display fields in which the actual and nominal values are displayed. However, the indicator device 12, 12' can be embodied such that upon retrieval of the nominal values from the data storage device 13 only the differential value to the actual and nominal position is displayed on the display 19. The operator of the molding machine must then carry out the adjustment such that the differential value is reduced to zero.

The molding machine has further adjustable elements such as stops, ledges, table tops and the like which must be adjusted manually relative to the tools and be workpieces. In order to be able to use the described method also for these elements, they are provided with a linear measuring system such as a linear potentiometer or magnetic strip which is coupled with a corresponding indicator device which in the described way indicates the actual and nominal values or the differential value. The adjustment of these elements can thus be carried out also in a simple way.

It is also possible that the indicator device 12, 12' shows on its display 19 only the actual value or the nominal value. By means of a switch (not illustrated) it is then possible to switch between the two indicated values. In this situation, the different spindles and adjustable elements can also be adjusted simply and reliably into the required position.

In an advantageous configuration of the method, the actual and the nominal values are shown on the display 19 of the indicator device 12, 12' for adjusting the elements to a new position. When both values coincide, the display 19 only shows the actual value which corresponds to the nominal value. When the corresponding element is moved from the adjusted position, in order to perform, for example, a corrective measure, or because the element has been moved accidentally, the operator is visually made aware of this displacement. The operator then knows that the actual value and the nominal value do not coincide. This can be realized, for example, by a blinking representation of the value shown on the display 19, by a change of the color of the displayed value, by a symbol additionally provided within the display, or similar measures. The operator switches the indicator device so that the actual value and the nominal value are shown again on the display 19. The operator can then adjust the adjusting element until the actual value and nominal value coincide again. This readjustment is necessary particularly when the adjusting element has been accidentally moved.

However, when the adjustment of the element was required as a corrective measure, for example, because the blades of a tool have been reground, the new actual position is saved in the described way as a new nominal value in the storage device 13.

While specific embodiments of the invention have been shown and described in detail to illustrate the inventive principles, it will be understood that the invention may be embodied otherwise without departing from such principles.

What is claimed is:

1. A molding machine for machining workpieces of wood or plastic material, the molding machine comprising:
a transport path for transporting workpieces in a transport direction;
adjustable spindles arranged sequentially in the transport direction on the transport path;
tools fixedly connected on the spindles;
adjusting elements adjustable and drivingly connected to the spindles;
first indicator devices connected to the adjusting elements and configured to indicate a position of the spindles relative to a reference point of the machine, respectively; and
at least one data storage device connected to the indicator devices and configured to save position data of the spindles and to allow retrieval of the position data of the spindles.

2. The molding machine according to claim 1, wherein the indicator devices are seated on the adjusting elements and fixed against rotation.

3. The molding machine according to claim 1, wherein the indicator devices have at least one display, respectively.

4. The molding machine according to claim 3, wherein the at least one display has two display windows.

5. The molding machine according to claim 1, wherein the at least one data storage device has at least one input device.

6. The molding machine according to claim 5, wherein the at least one input device has at least one input display.

7. The molding machine according to claim 5, wherein the at least one input device comprises an alpha-numeric keypad.

8. The molding machine according to claim 1, wherein at least one of the spindles is adjustable transversely to the transport direction.

9. The molding machine according to claim 8, wherein the at least one spindle has a spindle axis and is adjustable transversely to the spindle axis.

10. The molding machine according to claim 9, further comprising a transverse slide, wherein the at least one spindle is arranged on the transverse slide.

11. The molding machine according to claim 8, wherein the at least one spindle is adjustable in an axial direction of the spindle axis.

12. The molding machine according to claim 1, further comprising pressing elements correlated with the spindles, respectively, and at least one second indicator device for adjusting at least one of the pressing elements, wherein the at least one second indicator device is connected to the at least one data storage device.

13. A method for adjusting at least one spindle of a molding machine for machining workpieces of wood or plastic material, wherein the molding machine comprises a transport path for transporting workpieces in a transport direction, adjustable spindles arranged sequentially in the transport direction on the transport path, tools fixedly connected on the spindles, adjusting elements adjustable and drivingly connected to the spindles, indicator devices coupled to the adjusting elements and configured to indicate a position of the spindles relative to a reference point of the machine, respectively; and at least one data storage device; the method comprising the steps of:
positioning the at least one spindle in a predetermined position relative to the reference point of the machine;
saving the actual value to the predetermined position in the data storage device of the machine; and
retrieving the actual value of the predetermined position saved in the data storage device as a nominal value for adjusting the at least one spindle in the same predetermined position at a later time.

14. The method according to claim 13, further comprising the steps of:
displaying the nominal value on a display of an indicator device;
displaying an actual value of a current position of the at least one spindle; and
moving the at least one spindle until the actual value of the current position of the at least one spindle indicated on the display coincides with the nominal value.

15. The method according to claim 13, further comprising the steps of:
moving the at least one spindle into a required position for manufacturing a profile on a workpiece; and
saving the actual value of the required position in the data storage device under a name corresponding to the profile.

16. The method according to claim 13, wherein all of the spindles of the molding device are moved into the predetermined position relative to the reference point of the machine and wherein the actual value of the predetermined positions of all of the spindles are saved in the data storage device, respectively.

17. The method according to claim 13, wherein the nominal value is displayed on a display of the indicator device as a differential value relative to an actual value of a current position of the at least one spindle, and wherein the at least one spindle is moved until the differential value becomes zero.

18. The method according to claim 13, wherein the machine has pressing elements correlated with the spindles, wherein at least one of the pressing elements is moved into a predetermined position relative to a tool of the correlated spindle and the actual value of the predetermined position of the at least one pressing element is saved in the data storage device, wherein the actual value is retrieved as a nominal value from the data storage device for adjusting the at least one pressing element in the same predetermined position at a later time.

* * * * *